United States Patent [19]

Vidal

[11] 3,968,404

[45] July 6, 1976

[54] ARRANGEMENT FOR CONTROLLING THE VERTICAL DEFLECTION OF A FLYING SPOT TUBE

[75] Inventor: Serge Vidal, Paris, France

[73] Assignee: Thomson-CSF, Paris, France

[22] Filed: June 20, 1974

[21] Appl. No.: 481,405

[30] Foreign Application Priority Data
June 26, 1973 France .............................. 73.23298

[52] U.S. Cl. ............................ 315/398; 315/369; 178/DIG. 28
[51] Int. Cl.² ........................................ H01J 29/54
[58] Field of Search .......... 315/369, 394, 395, 398; 340/146.3 H, 146.3 AH; 178/DIG. 28

[56] References Cited
UNITED STATES PATENTS

| | | |
|---|---|---|
| 2,922,841 | 1/1960 | Graziano...................... 178/DIG. 28 |
| 3,621,137 | 11/1971 | Manber............................... 315/369 |
| 3,778,546 | 12/1973 | Trzeciak .......................... 178/DIG. 28 |
| 3,830,973 | 8/1974 | Peters .......................... 178/DIG. 28 |

Primary Examiner—Richard A. Farley
Attorney, Agent, or Firm—Cushman, Darby and Cushman

[57] ABSTRACT

In the course of each horizontal blanking interval, the spot of the flying spot tube is deflected in the vertical direction causing an image of the spot to meet a perforation of the film in fixed space relationship with the film frame being scanned. A pulse signal, generated when the image of the spot reaches the concerned perforation, is used as an input signal for the circuit delivering an error signal for controlling the vertical deflection of the tube.

3 Claims, 7 Drawing Figures

ARRANGEMENT FOR CONTROLLING THE VERTICAL DEFLECTION OF A FLYING SPOT TUBE

The present invention relates to an arrangement for controlling the vertical deflection of a flying spot tube in order to effect correct vertical scanning of the images in a film.

The scanning of a film using the flying spot tube method, requires correct positioning of the scanning field in relation to the successive film images or in other words frames.

It will be clear that if the relative displacements of the scanning field, on the one hand, and of the scanned frame, on the other, are not interconnected, then it is essential that each of these displacements should be executed with extremely high accuracy. Telecine equipment designed along this line is already known but equipment of this sort which achieves perfect film transport has the drawback that its mechanical systems are complicated and expensive.

It is also known to control the film transport mechanism of a telecine equipment or the mechanism driving the oscillating mirror of a telecine equipment equipped with such a mirror, in accordance with the position of the film, this position being marked by means of devices which detect the perforations. However, the design of these latter control systems necessitates the establishing of compromises which are difficult to choose, between the accuracy, the response time of the control systems and the mechanical complexity.

The object of the present invention is an arrangement for controlling the scanning of a flying spot tube, which makes it possible to effect accurate scanning of the frames of a film; the mechanical system of the telecine equipment which incorporates this device simply has the function of bringing the frame to be analysed to a zone where both the scanning and the collection of the light signals resulting from this scanning are possible.

In accordance with the invention, there is provided an arrangement for controlling the vertical deflection of a flying spot tube having a vertical deflection device in order to effect correct vertical scanning, in a fixed gate, of the frames of a film comprising a band of markers associated with said frames in a one-to-one relationship, said markers being formed by perforations of the film, said arrangement comprising: deflecting means for imparting to the spot of said tube, in the course of each horizontal blanking interval a vertical motion causing an image of said spot to meet the marker associated with the film frame being scanned; generating means for generating a pulse signal each time said image reaches said marker; first means for receiving the pulse signals generated by said generating means and the scanning horizontal and vertical sync. signals and generating error signals representative of the errors in the vertical position of the successive scanning lines relatively to the vertical position corresponding to said correct scanning; and second means controlled by said first means for correcting the vertical centering of said flying spot tube.

The invention will be better understood and other of its features rendered apparent, from a consideration of the ensuing description and the related drawings in which.

In the drawings, corresponding elements have been indicated by the same references.

In the ensuing description, the film transport devices, light-current converter arrangements and signal-processing systems, which are not directly concerned by the invention and which, unless otherwise indicated, may be of any known type, have more often than not neither been shown nor referred to.

The invention will be described in the case of interlaced scanning in a telecine equipment utilising an oscillating mirror which moves relatively slowly from a position $M_1$ to a position $M_2$ and then rapidly returns to the position $M_1$. In telecine equipments of this kind, during the slow movement of the mirror from position $M_1$ to position $M_2$, odd field scanning and then even field scanning are carried out on one and the same frame of the film and the rate of rotation of the mirror is such that the scanning raster is correctly positioned on the film.

Figure 1:
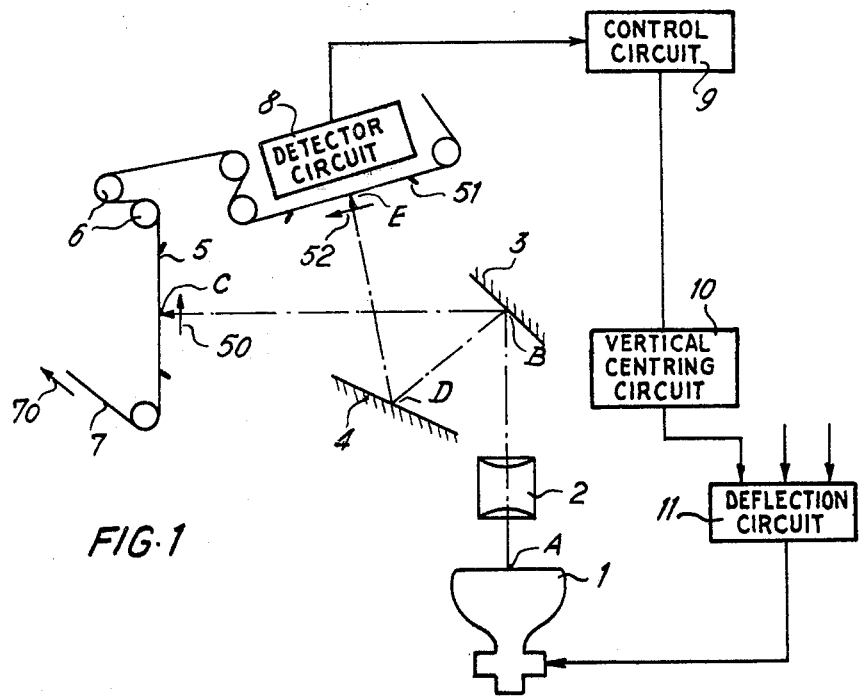
FIG. 1 is a partial, simplified diagram of a telecine equipment comprising an arrangement in accordance with the invention.

FIG. 1 illustrates a flying spot tube 1, an objective lens 2 and a fixed scanning gate 5 in the plane of which an image of the spot, produced by means of the lens 2 and an oscillating mirror 3, successively defines two scanning fields disposed one above the other. The position of those two fields may be adjusted in the vertical direction within the fixed scanning gate 5.

Of the transport device 6 for a film 7, only six rollers have been shown. The direction of transport of the film has been indicated by an arrow 70 and the direction of the vertical scanning in the fixed frame 5, by an arrow 50 directed in the opposite direction to the direction of transport of the film behind the gate 5.

Due to the special design of the oscillating mirror 3, which will be described in relation to FIGS. 2 and 3, and to a supplementary, fixed mirror 4, another field scanning function is performed inside an associated further gate 51 arranged at a location close to that part of the film contained in the gate 5.

Because of the inversion produced by the fixed mirror 4 this other field scan function, which will be referred to hereinafter as the associated scan or scanning function, takes place in the same direction as the direction of transport of the film.

The elements of this telecine equipment have been arranged so that the trajectories of the light between the spot on the tube 1, and the images of this spot in the gates 5 and 51, are of equal length, these are the trajectories ABC and ABDE of FIG. 1; the result is that since the divergent parts (BC, BDE) do not involve any focussing elements, scanning in the gate 5 and the associated scan have identical amplitudes and therefore speeds, in the vertical direction, which are identical in absolute value.

Thus, to achieve perfectly correct line by line scanning, it is necessary to effect a kind of control such that the spot image in the associated scan has, for each field, a speed of displacement, in the vertical direction, which is identical to the speed of film transport. To this end, that part of the light coming from the spot and passing through the associated gate 51 is picked up by the input photosensitive element of a detector circuit 8; this circuit, after amplification, supplies to a control circuit 9, which will be described in relation to FIG. 5, signals enabling this latter circuit to supply a correcting signal to the input of a circuit 10 responsible for the vertical centering of the spot produced by the tube 1. The circuit 10 comprises a potentiometer, one of whose ends is grounded, whose other end is connected to the output of the circuit 9 and whose center tap is connected to the first input of a deflection circuit 11 producing the vertical scanning function in the tube 1.

The circuit 11 is supplied respectively at its second and third inputs, with the vertical and horizontal synchronising pulses, and its output is connected to the input of the vertical deflection device of the tube 1. The circuit 11 supplies in addition to the conventional vertical deflection signal an additional signal, as will be explained when describing FIG. 4.

Figure 2:
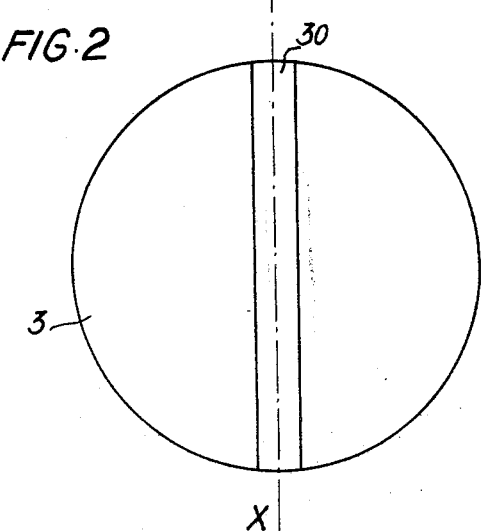
FIGS. 2 and 3 are more detailed views of an element of FIG. 1.

FIG. 2 is an elevational view of the oscillating mirror 3 shown in FIG. 1. This view shows the axis XX of rotation of the mirror. The mirror 3 comprises a groove 30 arranged in the direction of the axis XX and having an area making up around one tenth of the total effective area of the mirror.

Figure 3:
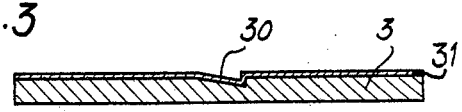

FIG. 3 is a view of the mirror 3 in section in a plane perpendicular to the axis XX and passing through the center of the mirror. This view shows the silvering deposit 31, much magnified, produced on the front face of the mirror.

FIGS. 2 and 3 illustrate the groove 30 as having a reflective surface inclined in relation to the reflective surface located outside the groove; it is this inclined reflective surface which makes it possible to deflect a small part of the main light beam along a trajectory such as that BDE in FIG. 1.

Self-evidently, the groove 30 can be replaced by a reflective patch stuck to the mirror, or by some other equivalent device.

Figure 4:
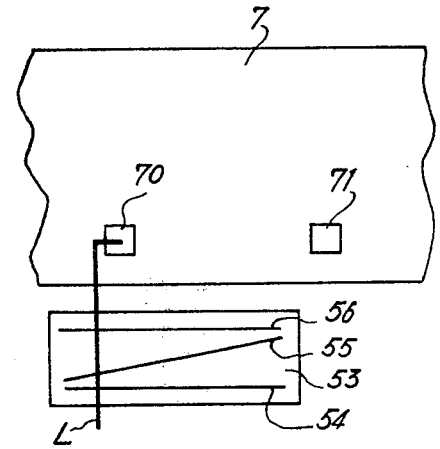
FIG. 4 is a detailed view of part of FIG. 1.

FIG. 4 illustrates that part of the film 7 which appears, at a given instant, in the associated scanning frame 51 of FIG. 1. The film comprises perforations 70, 71. Parallel to the direction of transport of the film 7 and in the plane of the film, there is arranged a fixed target 53 formed by an opaque plate comprising two transparent slots 54, 56 parallel to the direction of transport of the film, and a transparent slot 55 arranged obliquely between the slots 54, 56.

In FIG. 4, there has also been shown a scanning line L such as is produced by means of the tube 1, the objective lens 2 and the mirrors 3 and 4 (FIG. 1); this line has the conventional horizontal part and, at the beginning of its travel, a vertical portion. The inclination of the mirror 4 (FIG. 1) is such that most of the horizontal part of the scanning lines in the associated gate 51 is located outside the surface of the film 7, and that the vertical part of these lines is located in a band containing the perforations of the film.

Thus, the horizontal part of each line L scans the fixed target 53, as far as the vertical part is concerned, this scans a perforation such as that 70, since on the one hand it is located in the band containing the perforations and on the other the amplitude of its displacement in the vertical direction is chosen so that at least one edge of a perforation is always covered by the deflected part of a scanning line, whatever the errors in the positioning of the scanning field, which may stem from the oscillating mirror 3 of FIG. 1. To produce this vertical deflection, a sawtooth signal of adequate amplitude is applied, after each horizontal retrace, to the vertical deflection device of the tube 1. Of course, the sum of the rise time $t_2$ of the sawtooth signal and the time interval $t_1$ required for the line flyback, must be equal to no more than the line blanking interval of the video signals. Conventional scanning coils, of relatively low inductance however, make it possible to achieve this result.

It is through the circuit 11 of FIG. 1 that the vertical deflection at the beginning of each scanning line is produced; the circuit 11, to do so, comprises a monostable trigger circuit triggered by the trailing edge of the horizontal sync. pulses, the duration of whose quasi-stable state is shorter than the time interval between the trailing edge of a horizontal sync. pulse and the end of the corresponding horizontal blanking interval, and a sawtooth generator triggered by the trailing edge of the pulses from the trigger circuit. The output signals from this generator are mixed with the conventional vertical sweep signal, in order to form the output signal of the vertical deflection circuit 11.

Figure 5:
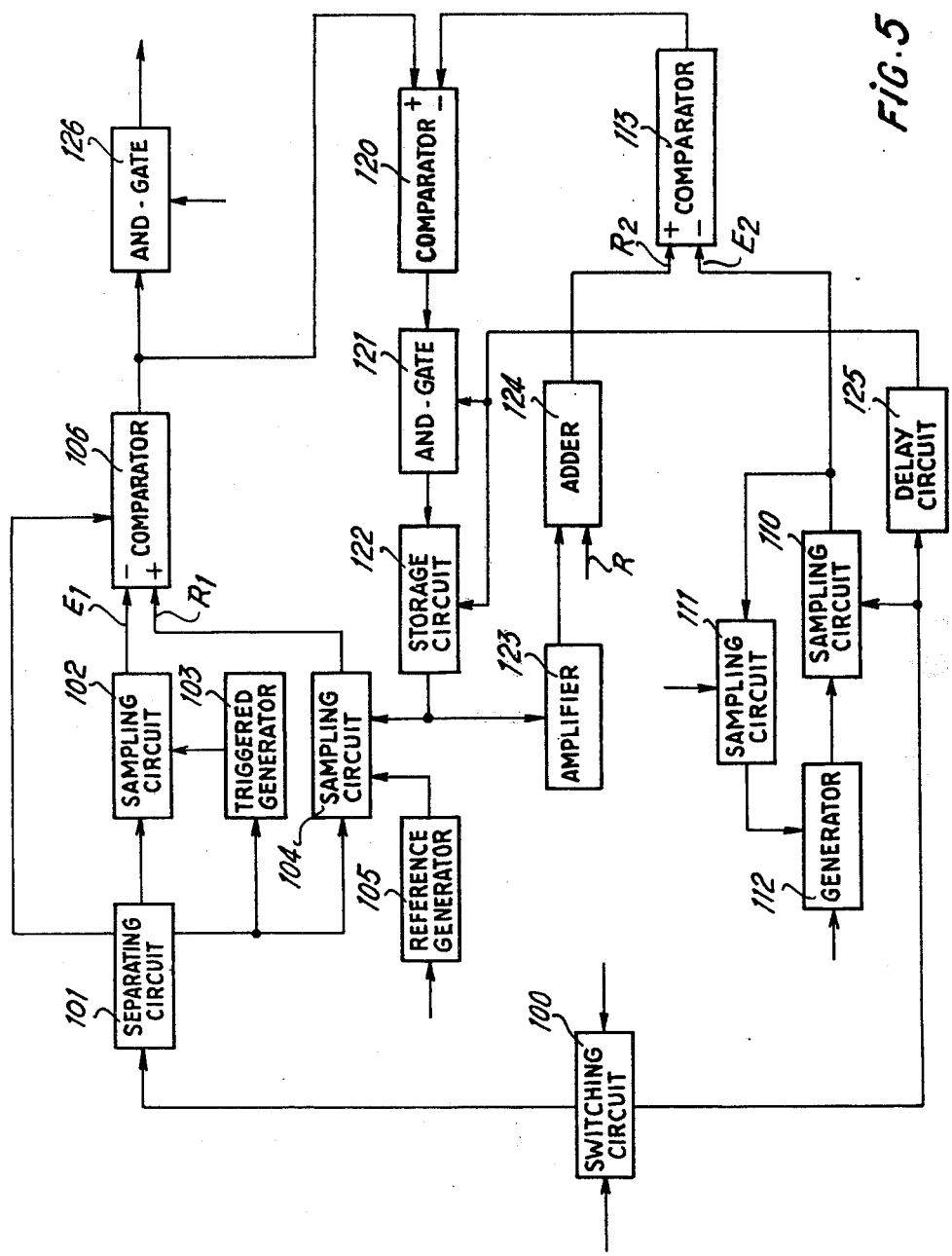
FIG. 5 is an electrical diagram of an embodiment of an element shown in FIG. 1.

FIG. 5 illustrates the embodiment of the control circuit 9 of FIG. 1.

A switching circuit 100 is supplied at its signal input with pulses shaped in the photoelectric detector circuit 8 of FIG. 1. These pulses, for each scanning line in the gate 51, are four in number and will be referred to in the order of their appearance as the perforation, the first slot, oblique slot, and last slot pulses; these pulses correspond respectively to the intersection between the vertical part of the same scanning line and the edge of a perforation and to the intersection between the horizontal part of a scanning line, and the slots 56, 55, 54.

A signal whose duration and phase correspond to the vertical part of the scanning line, for example the signal delivered by the above-mentioned trigger circuit included in circuit 11, is applied to the control input of the circuit 100; this signal is responsible for the supply of the slot pulses at a first output of the circuit 100 and for the supply of the perforation pulse at a second output of this circuit.

A separating circuit 101, whose input is connected to the first output of the switching circuit 100, respectively supplies at its first, second and third outputs, the first slot, oblique slot and last slot pulses.

The first slot pulse is used to control the production, by a triggered generator 103, of a sawtooth signal which is therefore at the line frequency of the flying spot tube.

The oblique slot pulse is used by a sampling circuit 102, which samples the sawtooth signal provided by the triggered generator 103, and which, for each line of a field, stores the level of the sawtooth signal at the instant of appearance of the oblique slot pulse up to the time of the appearance of the oblique slot corresponding to the next line. This circuit 102 can be constituted by a transistor unblocked by the oblique slot pulses and applying, during the time intervals for which it is unblocked, the sawtooth voltage to the terminals of a capacitor.

The output signal $E_1$ of the circuit 102, is therefore a step signal, the height of the $n^{th}$ step ($n = 1, 2, 3, ...$) being a function of the height of the $n^{th}$ scanning line on the target and therefore of the height of the corresponding scanning line in the gate 5.

If the scanning lines are regularly spaced from one to the next, the interval between the oblique slot pulse and the corresponding first slot pulse, will vary by a constant pitch. If, on the other hand, the field shifts between two scanning lines, the corresponding error will recur in all the subsequent steps of the relevant field.

This error is measured by comparing the output signal $E_1$ from the circuit 102 with a step signal $R_1$ produced by the sampling, in a circuit 104, of a reference sawtooth signal provided by a reference generator 105, the sampling pulses being the first slot pulses provided by the separating circuit 101. This reference generator 105 is triggered by the pulses used to control the vertical sweep in the flying spot tube. These pulses, as well as the slope of the sawtooth, are chosen so that the height of the $n^{th}$ step ($n = 1, 2, 3, ...$) in the output signal from the circuit 104 corresponds (to the extent that the reference potential appearing at the output of the latter does not vary) to the height of the $n^{th}$ step in the output signal from the circuit 102 when the height of the $n^{th}$ scanning line on the target corresponds to the desired height of the $n^{th}$ scanning line in the gate 5.

The sampling circuit 104 can be formed by a circuit similar to the sampling circuit 102, but also comprises an associated input for controlling the value of the reference potential at its output.

The step signals from the sampling circuit 102 (signal $E_1$) and the sampling circuit 104 (signal $R_1$) are respectively applied to the "−" and "+" inputs of a comparator 106; so that the comparison is effected at two steps corresponding to one and the same scanning line; it is controlled by the last slot pulse provided by the third output of the separating circuit 101.

The perforation pulses delivered by the second output of the switching circuit 100 are pulses whose leading edges correspond to the leading edges of the signals representing the detection of the film perforations. These pulses are applied to the control input of a sampling circuit 110. The circuit 110 is similar to the sampling circuit 102.

To the signal input of the circuit 110, a triggered generator 112 applies a sawtooth signal. The generator 112 is operated at the line scan frequency of the flying spot tube; the generator 112 and the sawtooth generator at the line frequency of the deflection circuit 11 of FIG. 1 are in fact formed by the same element.

Signal $E_2$ at the output of the sampling circuit 110 is applied to the "−" input of a comparator 113 whose "+" input is supplied with a reference signal $R_2$ which will be defined hereinafter.

The position of the edge of the perforations, in relation to the position of the frame or in other words image, may not always be strictly constant in view of the possibility of deterioration in the film perforations. To prevent the field positioning errors which would result as a consequence of this, the results of the measurement carried out are utilised in a differential way.

This method of working can be explained by the following three remarks;

— during the time of scanning a field, the reference is stable because it is one and the same perforation which is being utilised as the reference;

— the change in reference with change in perforation takes place between two field scans of the same image;

— the flyback of the mirror from its extreme position to its original position, on the other hand, takes place a field later when film frame change takes place.

Thus, the change in reference perforation takes place at the instant when the mirror is in the center of its travel and when control has been effective throughout the whole of a field. It may be appreciated that at this instant the field is in its most stable and accurate position in relation to the film frame. It is therefore possible to deduce that a positional error detected between two field scans of one and the same frame, stems from a shift in the edge of the perforation, relatively to its correct location.

Conversely, and this is an advantage of the method, the perforation which acts as the reference does not change when the mirror returns rapidly from its extreme position to its original position.

To avoid the inclusion of a change in the output potential from the sampling circuit 110, consequent upon a shift in the edge of the perforation, this same variation is subtracted from the potential of the sawtooth signal provided by the triggered generator 112. To this end, a sampling circuit 111 detects this variation, by a sampling operation, between respectively the last and first lines of the two successive fields corresponding to the scanning of one and the same film frame. The circuit 111 is to this end supplied at its sampling control input with the signals triggering the even fields, it being understood of course that the scanning of one and the same film frame is carried out, in the telecine equipment under consideration, by an odd field followed by an even field.

The element of FIG. 5 which are now to be described, are intented to link the reference signal provided by the sampling circuit 104, with the signal resulting from the measurement of the perforation signal, that is to say with the output signal from the comparator 113. The linking together of these two signals is justified by the following remarks:

incorrect position of the scanning line is recorded simultaneously by the device measuring the position of the lines (circuits 101 to 106) and by the device measuring the position of the perforations (circuits 110 to 112), the recorded error being identical;

by contrast, incorrect positioning of the perforation is recorded only by the device measuring the position of the perforations (circuits 110 to 112);

in the case of incorrect positioning of the scanning line, the error is cancelled out in the two devices by correcting the position of the scanning line;

in the case of incorrect positioning of the perforation, the error is cancelled out by a method which is yet to be described, this involving correction of the measurement references in order to adapt them to the effective position of the perforation;

in view of the reversal of the direction of displacement of the field scanning the film frame in relation to the scanning effected in the gate 51 shown in FIG. 1, the correction of the measurement references should be such that there corresponds to a displacement in one direction, of the perforation relatively to the scanning line, a displacement of said same line in the opposite direction.

The implementation of this method is carried out by means of the circuits shown in FIG. 5. An AND-gate 126 has its first input connected to the output of the comparator 106, its second input supplied with line frequency signals unblocking it during the horizontal retrace time intervals, its output forming the output of the circuit 9 shown in FIG. 1, which output is connected to the vertical centring circuit of the flying spot tube. The "+" and "−" inputs of a comparator 120 are respectively connected to the outputs of the comparators 106 and 113. An AND-gate, 121, has its first input connected to the output of the comparator 120, and its second input supplied, across a delay circuit 125, with the perforation pulses; the delay introduced by the circuit 125 is chosen so that the AND-gate 121 only opens after the comparator 120 has received at its two inputs signals corresponding to one and the same scanned line. A storage circuit 122 comprises a transfer device controlled by the trailing edge of the perforation signal delayed by the circuit 125; the input of the storage circuit 122 is connected to the output of the AND-gate 121 and its output is connected to the associated input of the sampling circuit 104. The input of a voltage amplifier 123, having a constant gain of 2, is connected to the output of the storage circuit 122. An adder 124 has its first input connected to the output of the amplifier 123, and its second input supplied with a fixed direct voltage of adjustable value R, its output (signal $R_2$) being connected to the "+" input of the comparator 113.

Thus if, considering FIG. 4, it is assumed that the line L is too far to the right, but that the perforation 70 is correctly located, this incorrect offset of the line produces a similar offset in voltage of the signals $E_1$ and $E_2$ which are the output signals of the circuits 102 and 110, (FIG. 5). The error voltages appearing as a consequence at the outputs of the comparators 106 and 113 are identical and consequently no signal appears at the output of the comparator 120. Accordingly, the signal at the output of the AND-gate 121 is zero and the levels of the reference signals $R_1$ and $R_2$ are not modified by the line offset. In actual fact, this is only true if the two voltages appear simultaneously at the inputs of the comparator 120, that is to say after the scanning of the perforation; hence the use of the AND-gate 121 which only transmits the output potential of the comparator 120 a certain time after the appearance of the perforation signal. As far as the storage circuit 122 is concerned, this is designed to prevent the output of the comparator 120 from being connected to its input through a closed loop. The error voltage appearing at the output of the comparator 106 is supplied to the vertical centering circuit of the tube, through the AND-gate 126, the latter only being open during the horizontal retrace time intervals.

If it is now assumed, considering FIG. 4, that the perforation 70 is too far to the right and that the line has remained correctly positioned in relation to the fixed target 53, this incorrect offset of the perforation produces no error voltage at the output of the comparator 106. On the other hand, the voltage $E_2$ resulting from the scanning of the perforations increases, producing a negative error voltage at the output of the comparator 113 and therefore a positive error voltage at the output of the comparator 120; this latter voltage is transmitted by the storage circuit 122 directly to the sampling circuit 104 and, through the amplifier 123, to the adder 124.

Thus, on the one hand, the voltage $R_1$ causes the scanning field to shift in a direction opposite to that of the offset of the perforation and indeed with equal amplitude, and on the other hand the voltage $R_2$ restores the system to equilibrium, taking into account the instantaneous position of the perforation 70 in relation to the target 53 (FIG. 4). This procedure makes it possible to render the scanning field dependent upon the perforations in the film.

It should be borne in mind that the position of the scanning field in relation to the perforation is linked to the value of the potential R. It is therefore possible, by means of this potential, to vary this position, in accordance with a known law, in relation to the perforation; for example, were the mirror 3 of FIG. 1 to be fixed, it would be possible to effect field scanning by varying R.

Figure 6:
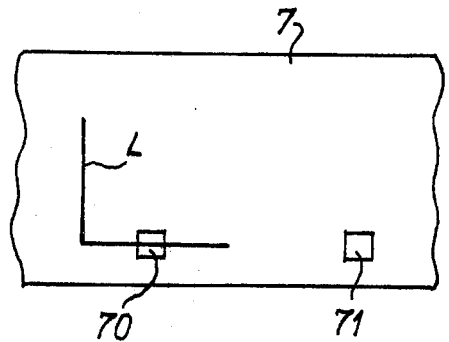
FIG. 6 is a detailed view illustrating a variant form of the arrangment in accordance with the invention shown in FIG. 1.
Figure 7:
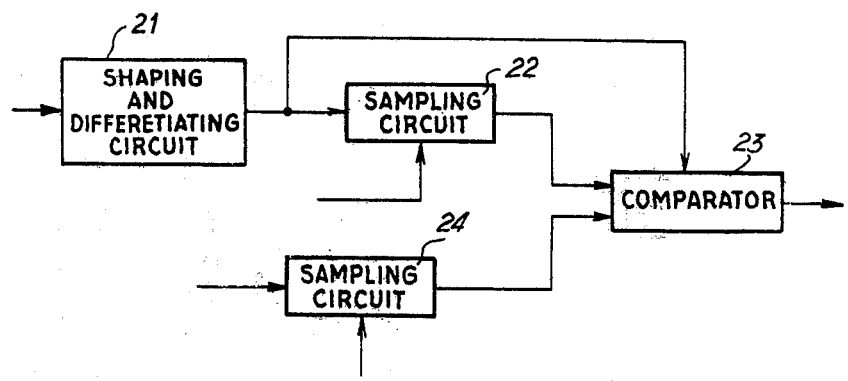
FIG. 7 is an electrical diagram associated with the detailed view of FIG. 6.

FIGS. 6 and 7 illustrate a second embodiment of the invention which does not require an auxiliary scanning.

FIG. 6 shows a film 7 and two perforations 70, 71 each representative of a frame of the film. A scanning line L scans the film; the line L comprises, as in the embodiment described in respect of FIGS. 1 to 5, a horizontal portion and a vertical portion. The horizontal portion is used to effect a conventional scanning of the frame; the vertical portion reads the perforations.

The transiting of a perforation by the scanning spot, produces a light modulation which is processed by lightcurrent converting circuits of the telecine equipment in the same fashion as the modulation which is due to the frame or image. The electrical signal resulting from this operation and which will be called the perforation signal, is separated from the image signal.

FIG. 7 illustrates the embodiment of an assembly of circuits designed to control the deflection of the flying spot tube of the telecine equipment in question, as a function of this perforation signal.

The perforation signal is converted, in a shaping and differentiating circuit 21, into a pulse which will be called perforation pulse and which corresponds to the passage of the spot image into the perforated part.

The line frequency sawtooth signal producing the vertical deflection of the scanning line is sampled in a sampling circuit 22 by the perforation pulse. The operation of the sampling circuit 22 is the same as that of the sampling circuits of FIG. 5, that is to say that the level of the signal at the instant of appearance of a pulse is stored until the appearance of the next pulse.

The signal produced by the sampling circuit 22 is a step signal the number of steps in which is equal to the number of scanning lines and the height of the steps in which is proportional to the pitch of the interval between the perforation and the horizontal part of the scanning line.

The output signal from the circuit 22 is compared, in a comparator 23, with a reference signal representing the law of vertical displacement which the scanning lines must obey. The reference signal is obtained by sampling, in a sampling circuit 24, a reference sawtooth signal of field frequency; the sampling signal is obtained at the output of a delay circuit (not shown), to whose input there are applied the horizontal sync. pulses employed to trigger the deflected part of the scanning line.

In order for the comparison of the step signals received at the two inputs of the comparator 23 to take place over two steps corresponding to one and the same scanning line, this comparison is controlled by the trailing edge of the perforation pulse.

The error signal produced by the comparator 23 is applied to the vertical centering circuit of the flying spot tube.

Thus, the characteristics of the scanning fields obtained in each of the two examples described are linked to a reference signal and their position is made subject, during each line period, to the position of the film frame.

Everything that has been said so far presumes that the film being scanned comprises a single perforation per frame. If it has a higher number k, for example four as in the case of a 35 mm film, it is possible, using a photo-sensitive device which detects the passage of the perforations, to count these perforations, using a modulo-k counter and for example to take into account only those perforation pulses corresponding to each $k^{th}$ perforation.

It is seen that the second embodiment of the invention is simpler than the first one; however, contrarily to the first one, it does not provide for the case where some perforations are offset in relation to their correct positions.

The invention has been described in relation to a telecine equipment using interlaced scanning, and in the first example, (FIGS. 1 to 5), in relation to a telecine equipment utilising an oscillating mirror. Self-evidently, the invention could equally well be applied after some adjustments which are well within the scope of the person skilled in the art, to any telecine equipment using the flying spot principle.

Similarly, the associated scanning function, when necessary, could be performed by any optical device which is capable, in particular, of satisfying the condition of the length of the optical trajectory; thus, semi-transparent mirrors or assemblies of optical fibres could be used.

As far as the fixed target used in the first embodiment is concerned, its oblique slot which is designed to measure the position of the scanning line, could be replaced by a vertical reference scale calibrated for example in the Gray code. In this case, a digital-analogue converter would be used to directly produce the signal $E_1$ of FIG. 5.

Of course, the invention is not limited to the embodiments described and shown which were given solely by way of example.

What is claimed is:

1. An arrangement for controlling the vertical deflection of a flying spot tube having a vertical deflection device, in order to effect correct vertical scanning, in a fixed gate, of the frames of a film comprising a band of markers associated with said frames in a one-to-one relationship, said markers being formed by perforations of the film, said arrangement comprising: deflecting means for imparting to the spot of said tube, in the course of each horizontal blanking interval a vertical motion causing an image of said spot to meet the marker associated with the film frame being scanned; generating means for generating a pulse signal each time said image reaches said marker; first means for receiving the pulse signals generated by said generating means and the scanning horizontal and vertical sync. signals and generating error signals representative of the errors in the vertical position of the successive scanning lines relatively to the vertical position corresponding to said correct scanning; and second means controlled by said first means for correcting the vertical centering of said flying spot tube.

2. An arrangement for controlling the vertical deflection of a flying spot tube having a vertical deflection device, in order to effect correct vertical scanning, in a fixed gate, of the frames of a film comprising a band of markers associated with said frames in a one-to-one relationship, said markers being formed by perforations of the film, said arrangement comprising: deflecting means for imparting to the spot of said tube, in the course of each horizontal blanking interval, a vertical motion causing an image of said spot to meet the marker associated with the film frame being scanned; a fixed target having light responsive portions, said target being located in the vicinity of said film at a distance from said gate; optical means for forming said image of the spot so that the motion of said image due to the vertical scanning deflection in said flying spot tube occurs in the same direction as the film displacement and that the motion of said image due to the horizontal deflection in said flying spot tube occurs partly on said target and partly on said band of markers; generating means for generating a pulse signal each time said image reaches said marker and for delivering target signals upon said image reaching said portions of said target; first means for receiving the pulse signals generated by said generating means, the scanning horizontal and vertical sync. signals and said target signals, said first means comprising: first auxiliary means for receiving said target signals and delivering an output signal representative of the position of said image on said target, second auxiliary means for receiving said target signals and said pulse signals and delivering a reference signal representative, for said correct vertical scanning, of the correct position of said image relatively to the position of said film, and a comparator for receiving said reference signal and said output signal and delivering error signals representative of the errors in the vertical position of the successive scanning lines relatively to the vertical position corresponding to said correct scanning; and second means controlled by said first means for correcting the vertical centering of said flying spot tube.

3. An arrangement for controlling the vertical deflection of a flying spot tube having a vertical deflection device, in order to effect correct vertical scanning, in a fixed gate, of the frames of a film comprising a band of markers associated with said frames in a one-to-one relationship, said markers being formed by perforations of the film, said arrangement comprising: deflecting means for imparting to the spot of said tube, in the course of each horizontal blanking interval a vertical motion causing an image of said spot to meet the marker associated with the film frame being scanned; generating means for generating a pulse signal each time said image reaches said marker; first means comprising: first auxiliary means for receiving the pulse signals generated by said generating means and the scanning horizontal sync. signals and delivering signals successively representative of the distance between the marker associated with the film frame being scanned and said successive scanning lines, second auxiliary means for receiving the horizontal and vertical sync. signals and delivering a reference signal representative, for a correct scanning, of the law of variation of said distance and a comparator for receiving the signals delivered by said first and second auxiliary means and generating error signals representative of the errors in the vertical position of the successive scanning lines relatively to the vertical position corresponding to said correct scanning; and second means controlled by said first means for correcting the vertical centering of said flying spot tube.

\* \* \* \* \*